US008849284B2

(12) United States Patent
Hapsari et al.

(10) Patent No.: US 8,849,284 B2
(45) Date of Patent: *Sep. 30, 2014

(54) MOBILE COMMUNICATION METHOD, RADIO ACCESS APPARATUS, AND GATEWAY APPARATUS

(71) Applicant: NTT DoCoMo, Inc., Tokyo (JP)

(72) Inventors: Wuri Andarmawanti Hapsari, Chiyoda (JP); Minami Ishii, Tokyo (JP); Keisuke Suzuki, Kanagawa (JP); Hiroto Tooyama, Kanagawa (JP); Yoshifumi Morihiro, Chiyoda (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/862,981

(22) Filed: Apr. 15, 2013

(65) Prior Publication Data

US 2013/0231117 A1 Sep. 5, 2013

Related U.S. Application Data

(63) Continuation of application No. 13/142,344, filed as application No. PCT/JP2009/071432 on Dec. 24, 2009, now Pat. No. 8,442,534.

(30) Foreign Application Priority Data

Dec. 26, 2008 (JP) ................................. 2008-335058

(51) Int. Cl.
*H04W 36/00* (2009.01)
*H04W 36/14* (2009.01)
*H04W 99/00* (2009.01)
*H04W 88/16* (2009.01)
*H04W 88/06* (2009.01)
*H04W 92/20* (2009.01)
*H04W 88/04* (2009.01)

(52) U.S. Cl.
CPC .............. *H04W 36/14* (2013.01); *H04W 88/16* (2013.01); *H04W 36/00* (2013.01); *H04W 99/00* (2013.01); *H04W 88/06* (2013.01); *H04W 92/20* (2013.01); *H04W 88/04* (2013.01)

USPC ............ 455/436; 455/438; 455/442; 455/517

(58) Field of Classification Search
CPC ..... H04W 36/14; H04W 36/00; H04W 88/04; H04W 88/06; H04W 88/16; H04W 99/00; H04W 92/20
USPC ............. 455/422.1, 424, 432.1–432.3, 435.2, 455/436–444, 101, 517; 370/331
See application file for complete search history.

(56) References Cited

U.S. PATENT DOCUMENTS 5,896,373 A 4/1999 Mitts et al.
8,073,446 B2 12/2011 Ishii et al.
(Continued)

FOREIGN PATENT DOCUMENTS

JP 2001-500675 A 1/2001
JP 2006-246481 A 9/2006
(Continued)

OTHER PUBLICATIONS

International Search Report w/translation from PCT/JP2009/071432 dated Apr. 6, 2010 (4 pages).
(Continued)

*Primary Examiner* — Dominic E Rego
(74) *Attorney, Agent, or Firm* — Osha Liang LLP

(57) ABSTRACT

A mobile communication method according to the present invention includes the steps of: when a gateway apparatus (S-GW) is switched from a first state where downlink data is transmitted to a first radio access apparatus to a second state where the downlink data is transmitted to a second radio access apparatus, transferring, from the first radio access apparatus to the second radio access apparatus, the downlink data which is received from the gateway apparatus and to which specific information is added; and transmitting, from the second radio access apparatus to a mobile station (UE), transfer downlink data which is transferred from the first radio access apparatus and to which the specific information is added, before new downlink data transmitted from the gateway apparatus (S-GW).

2 Claims, 15 Drawing Sheets

(56) References Cited

U.S. PATENT DOCUMENTS

| | | | |
|---|---|---|---|
| 8,077,671 | B2 | 12/2011 | Lee et al. |
| 2002/0178236 | A1 | 11/2002 | Patel et al. |
| 2003/0079032 | A1 | 4/2003 | Orsolits et al. |
| 2005/0068994 | A1 | 3/2005 | DiCamillo et al. |
| 2005/0192010 | A1 | 9/2005 | Kirla |
| 2007/0021120 | A1 | 1/2007 | Flore et al. |
| 2007/0091805 | A1 | 4/2007 | Ramprashad et al. |
| 2007/0167164 | A1 | 7/2007 | Kirla |
| 2007/0213058 | A1* | 9/2007 | Shaheen ............ 455/436 |
| 2007/0213060 | A1* | 9/2007 | Shaheen ............ 455/436 |
| 2008/0076432 | A1 | 3/2008 | Senarath et al. |
| 2008/0113670 | A1 | 5/2008 | Dufour et al. |
| 2008/0188223 | A1 | 8/2008 | Vesterinen et al. |
| 2009/0264128 | A1 | 10/2009 | Tomisawa |
| 2010/0130208 | A1 | 5/2010 | Hayashi et al. |

FOREIGN PATENT DOCUMENTS

| | | |
|---|---|---|
| JP | 2007-266790 A | 10/2007 |
| WO | 2007/103496 A1 | 9/2007 |

OTHER PUBLICATIONS

3GPP TS 23.401 V10.3.0; "3rd Generation Partnership Project; Technical Specification Group Services and System Aspects; General Packet Radio Service (GPRS) Enhancements for Evolved Universal Terrestrial Radio Access Network (E-UTRAN) Access (Release 10)"; Mar. 2011 (278 pages).

Japanese Office Action for Japanese Patent Application No. 2008-335058 mailed Mar. 30, 2010, with English translation thereof (5 pages).

Japanese Office Action for Japanese Patent Application No. 2008-335058 mailed Oct. 19, 2010, with English translation thereof (4 pages).

Patent Abstract for Japanese Publication No. 2007-266790 Published Oct. 11, 2007 (1 page).

Office Action for Japanese Application No. 2011-001209 mailed Feb. 28, 2012, with English translation thereof (5 pages).

3GPP TS 23.401 V8.2.0; "3rd Generation Partnership Project; Technical Specification Group Services and System Aspects; General Packet Radio Services (GPRS) enhancements for Evolved Universal Terrestrial Radio Access Network (E-UTRAN) access (Release 8)"; Jun. 2008 (14 pages).

Notice of Grounds for Rejection for Japanese Patent Application No. 2008-335058 mailed Jun. 5, 2012, with English translation thereof (5 pages).

Office Action for Mexican Patent Application No. MX/a/2011/006931 dated Jul. 19, 2012, with English translation thereof (4 pages).

Office Action for Chinese Patent Application No. 200980152739.1, issued Aug. 22, 2013, with English translation thereof (12 pages).

Office Action in corresponding Japanese application No. 2012-104960 dated Aug. 27, 2013 (5 pages).

NTT Docomo, Nokia Siemens Networks; "Packet Reordering in E-UTRAN for S1-HO and UTRAN Iu mode to E-UTRAN Inter-RAT handover without SGW change"; 3GPP TSG-SA WG2 Meeting #69, S2-088282; Miami, USA, Nov. 17-21, 2008 (19 pages).

Ericsson; "Downlink Reordering at Intra-LTE Mobility"; 3GPP TSG-RAN WG3 #57-bis, R3-071828; Sophia Antipolis, France, Oct. 8-11, 2007 (5 pages).

3GPP TS 36.300 V8.6.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; 2008-2009 (9 pages).

Office Action in corresponding Chinese Patent Application No. 200980152739.1 dated Mar. 4, 2014, with translation (16 pages)

* cited by examiner

FIG. 3

| OCTETS | BITS | | | | | | | |
|---|---|---|---|---|---|---|---|---|
| | 8 | 7 | 6 | 5 | 4 | 3 | 2 | 1 |
| 1 | VERSION ||| PT | (*) | E | S | PN |
| 2 | MESSAGE TYPE |||||||||
| 3 | LENGTH (1st OCTET) |||||||||
| 4 | LENGTH (2nd OCTET) |||||||||
| 5 | TUNNEL ENDPOINT IDENTIFIER (1st OCTET) |||||||||
| 6 | TUNNEL ENDPOINT IDENTIFIER (2nd OCTET) |||||||||
| 7 | TUNNEL ENDPOINT IDENTIFIER (3rd OCTET) |||||||||
| 8 | TUNNEL ENDPOINT IDENTIFIER (4th OCTET) |||||||||
| 9 | SEQUENCE NUMBER (1st OCTET) |||||||||
| 10 | SEQUENCE NUMBER (2nd OCTET) |||||||||
| 11 | N-PDU NUMBER |||||||||
| 12 | NEXT EXTENSION HEADER TYPE |||||||||

FIG. 4

○ EXTENSION HEADER OF' NEXT EXTENSION HEADER FIELD VALUE'

| NEXT EXTENSION HEADER FIELD VALUE | TYPE OF EXTENSION HEADER |
|---|---|
| 0000 0000 | NO MORE EXTENSION HEADERS |
| 0000 0001 | RESERVED-MBMS SUPPORT INDICATION [4]. CONTROL PLANE ONLY. |
| 0000 0010 | RESERVED-MS INFO CHANGE REPORTING SUPPORT INDICATION [4]. CONTROL PLANE ONLY. |
| 1100 0000 | RESERVED-PDCP PDU NUMBER FOR UTRAN OR EUTRAN |
| 1100 0001 | RESERVED-SUSPEND REQUEST [4]. CONTROL PLANE ONLY. |
| 1100 0010 | RESERVED-SUSPEND RESPONSE [4]. CONTROL PLANE ONLY. |
| 10xx xxxx OR 11xx xxxx | FORWARDING DATA INDICATION |

○ DATA FORWARDING INDICATION EXTENSION HEADER OF FORMAT(SHOWN BELOW):
　◇ CONVENTIONAL EXTENSION HEADER FORMAT IS USED,
　◇ LENGTH 4 BYTE
　◇ ARBITRARY SETTING IS POSSIBLE AS EXTENSION HEADER CONTENT

| OCTETS | 8 | 7 | 6 | 5 | 4 | 3 | 2 | 1 |
|---|---|---|---|---|---|---|---|---|
| 1 | | | | 1 | | | | |
| 2 | | | | 0xFF | | | | |
| 3 | | | | 0xFF | | | | |
| 4 | | | NEXT EXTENSION HEADER TYPE | | | | | |

MOBILE COMMUNICATION METHOD, RADIO ACCESS APPARATUS, AND GATEWAY APPARATUS

CROSS-REFERENCE TO RELATED APPLICATIONS

This application is a continuation application of U.S. patent application Ser. No. 13/142,344 filed Jun. 27, 2011, which is a national stage application of PCT/JP2009/071432 filed on Dec. 24, 2009, which claims priority to Japanese Patent Application No. 2008-335058 filed on Dec. 26, 2008.

TECHNICAL FIELD

The present invention relates to a mobile communication method, a radio access apparatus, and a gateway apparatus.

BACKGROUND ART

In a mobile communication system defined in the 3GPP, when a mobile station UE performs an Inter-RAT (Radio Access Technology) handover between a cell of the E-UTRAN (Evolved Terrestrial Radio Access Network) scheme and a cell of the UTRAN scheme, a radio access apparatus of a handover source (for example, a radio network controller RNC and a radio base station eNB) can transfer downlink data destined for the mobile station UE which is transmitted from a serving gateway apparatus S-GW to a radio access apparatus of a handover target, as illustrated in FIG. 15.

However, in a conventional mobile communication system, a radio access apparatus of a handover target is configured to receive not only the downlink data transferred from the radio access apparatus of a handover source as described above but also receive downlink data transmitted from the serving gateway apparatus S-GW.

In such a case, however, the radio access apparatus of a handover target cannot easily distinguish between the downlink data transferred from the radio access apparatus of a handover source and the downlink data transmitted from the serving gateway apparatus S-GW, resulting in a problem that it is difficult to perform a reordering control of the both data.

Therefore, the present invention is intended to overcome the above-described problem. An object of the present invention is to provide a mobile communication method, a radio access apparatus, and a gateway apparatus, capable of performing a reordering control of downlink data in a radio access apparatus of a handover target when performing an Inter-RAT handover.

SUMMARY OF THE INVENTION

A first aspect of the present invention is summarized as a mobile communication method in which a mobile station receives downlink data from one of a first radio access apparatus within a first radio access network and a second radio access apparatus within a second radio access network, the method comprising the steps of: when a gateway apparatus, that connects the first radio access network and the second radio access network, is switched from a first state where the downlink data is transmitted to the first radio access apparatus to a second state where the downlink data is transmitted to the second radio access apparatus, (A) setting, at the first radio access apparatus, specific information to the downlink data received from the gateway apparatus, and transferring, from the first radio access apparatus to the second radio access apparatus, the downlink data; and (B) transmitting, from the second radio access apparatus to the mobile station, transfer downlink data which has been transferred from the first radio access apparatus and to which the specific information has been set, before transfer downlink data which has been transmitted from the gateway apparatus and to which the specific information has not been set.

In the first aspect of the present invention, one first tunnel may be set between the gateway apparatus and a switching center that is connected to the second radio access network; one second tunnel may be set between the switching center and the second radio access apparatus; in the second state, the transfer downlink data may be transferred from the first radio access apparatus to the second radio access apparatus via the first tunnel and the second tunnel; and in the second state, the new downlink data may be transferred from the gateway apparatus to the second radio access apparatus via the first tunnel and the second tunnel.

In the first aspect of the present invention, a tunnel for new downlink data and a tunnel for transfer downlink data may be set between the second radio access apparatus and a gateway apparatus that connects the first radio access network and the second radio access network, between the gateway apparatus and a switching center that is connected to the first radio access network, and between the switching center and the first radio access apparatus; and in the step (A), the first radio access apparatus may transfer downlink data to which the specific information has been added, to the second radio access apparatus via the tunnel for transfer downlink data.

In the first aspect of the present invention, the method may includes the steps of: transmitting, from the gateway apparatus to the first radio access apparatus, a specific message, after the gateway apparatus has transmitted the last downlink data; and transferring, from the first radio access apparatus to the second radio access apparatus, the specific message; and in the step (B), the second radio access apparatus may transmit transfer downlink data to which the specific information has not been set, after receiving the specific message.

A second aspect of the present invention is summarized as a mobile communication method in which a mobile station receives downlink data from one of a first radio access apparatus within a first radio access network and a second radio access apparatus within a second radio access network, the method comprising the steps of: when a tunnel for new downlink data and a tunnel for transfer downlink data are set between the second radio access apparatus and a gateway apparatus that connects the first radio access network and the second radio access network, between the gateway apparatus and a switching center that is connected to the first radio access network or the second radio access network, and between the switching center and the first radio access apparatus, and when the gateway apparatus is switched from a first state where the downlink data is transmitted to the first radio access apparatus via the tunnel for new downlink data to a second state where the downlink data is transmitted to the second radio access apparatus via the tunnel for new downlink data, transferring, from the first radio access apparatus to the second radio access apparatus via the tunnel for transfer downlink data, the downlink data received from the gateway apparatus; in the step, the first radio access network transmits a specific message to the second radio access apparatus after transmitting the last downlink data to be transferred to the second radio access apparatus; the second radio access apparatus transmits, to the mobile station, transfer downlink data transferred from the first radio access apparatus before new downlink data transferred from the gateway apparatus, and transmits the new downlink data to the mobile station after receiving the specific message.

A third aspect of the present invention is summarized as a mobile communication method in which a mobile station receives downlink data from one of a first radio access apparatus within a first radio access network and a second radio access apparatus within a second radio access network, wherein, even when a gateway apparatus, that connects the first radio access network and the second radio access network, is switched from a first state where the downlink data is transmitted to the first radio access apparatus to a second state where the downlink data is transmitted to the second radio access apparatus, the first radio access apparatus does not transmit downlink data to the second radio access apparatus, until the transfer to the second radio access apparatus of the downlink data received from the gateway apparatus is completed.

In the third aspect of the present invention, one first tunnel may be set between the gateway apparatus and a switching center that is connected to the second radio access network; one second tunnel may be set between the switching center and the second radio access apparatus; in the second state, the transfer downlink data may be transferred from the first radio access apparatus to the second radio access apparatus via the first tunnel and the second tunnel; and in a second state, the new downlink data may be transferred from the gateway apparatus to the second radio access apparatus via the first tunnel and the second tunnel.

In the third aspect of the present invention, a tunnel for new downlink data and a tunnel for transfer downlink data may be set between the second radio access apparatus and a gateway apparatus that connects the first radio access network and the second radio access network, between the gateway apparatus and a switching center that is connected to the first radio access network, and between the switching center and the first radio access apparatus; and the first radio access apparatus may transfer downlink data received via the tunnel for new downlink data, to the second radio access apparatus via the tunnel for transfer downlink data.

In the third aspect of the present invention, the method may includes the steps of: transmitting, from the gateway apparatus to the first radio access apparatus, a specific message, after the gateway apparatus has transmitted the last downlink data in the second state; and transferring, from the first radio access apparatus to the second radio access apparatus, the specific message; and
the second radio access apparatus may recognize that the transfer of the downlink data to the second radio access apparatus is completed, when receiving the specific message.

A fourth aspect of the present invention is summarized as a radio access apparatus that can operate as a first radio access apparatus in a mobile communication system in which a mobile station receives downlink data from one of a first radio access apparatus within the first radio access network and a second radio access apparatus within a second radio access network, wherein, when a gateway apparatus, that connects the first radio access network and the second radio access network, is switched from a first state where the downlink data is transmitted to the first radio access apparatus to a second state where the downlink data is transmitted to the second radio access apparatus, the radio access apparatus is configured to set specific information to the downlink data received from the gateway apparatus, and to transfer the downlink data to the second radio access apparatus A fifth aspect of the present invention is summarized as a radio access apparatus that can operate as a second radio access apparatus in a mobile communication system in which a mobile station receives downlink data from one of a first radio access apparatus within a first radio access network and the second radio access apparatus within a second radio access network, wherein, when a gateway apparatus, that connects the first radio access network and the second radio access network, is switched from a first state where the downlink data is transmitted to the first radio access apparatus to a second state where the downlink data is transmitted to the second radio access apparatus, the radio access apparatus is configured to transmit, to the mobile station, transfer downlink data which has been transferred from the first radio access apparatus and to which specific information has been set, before new downlink data which has been transmitted from the gateway apparatus and to which specific information has not been set.

A sixth aspect of the present invention is summarized as a radio access apparatus that can operate as a second radio access apparatus in a mobile communication system in which a mobile station receives downlink data from one of a first radio access apparatus within a first radio access network and the second radio access apparatus within a second radio access network, wherein, when a tunnel for new downlink data and a tunnel for transfer downlink data are set between the second radio access apparatus and a gateway apparatus that connects the first radio access network and the second radio access network, between the gateway apparatus and a switching center that is connected to the first radio access network or the second radio access network, and between the switching center and the first radio access apparatus, and when the gateway apparatus is switched from a first state where the downlink data is transmitted to the first radio access apparatus via the tunnel for new downlink data to a second state where the downlink data is transmitted to the second radio access apparatus via the tunnel for new downlink data, the radio access apparatus is configured to transmit, to the mobile station, transfer downlink data which has been transferred from the first radio access apparatus via the tunnel for transfer downlink data, before new downlink data which has been transmitted from the gateway apparatus via the tunnel for new downlink data; and to transmit the new downlink data to the mobile station, after receiving a specific message.

A seventh aspect of the present invention is summarized as a gateway apparatus that connects a first radio access network and a second radio access network in a mobile communication system in which a mobile station receives downlink data from one of a first radio access apparatus within the first radio access network and the second radio access apparatus within the second radio access network, wherein, even when the gateway apparatus is switched from a first state where the downlink data is transmitted to the first radio access apparatus to a second state where the downlink data is transmitted to the second radio access apparatus, the gateway apparatus is configured not to transmit downlink data to the second radio access apparatus, until the transfer from the first radio access apparatus to the second radio access apparatus of the downlink data received from the gateway apparatus is completed.

As described above, according to the present invention, it is possible to provide a mobile communication method, a radio access apparatus, and a gateway apparatus, capable of performing a reordering control of downlink data in a radio access apparatus of a handover target, when an Inter-RAT handover is performed.

BRIEF DESCRIPTION OF THE DRAWINGS

FIG. 3 is a diagram illustrating one example of a GTP-U header added to downlink data transferred during the Inter-RAT handover performed in the mobile communication system according to the first embodiment of the present invention.

FIG. 4 is a diagram illustrating one example of a GTP-U header added to downlink data transferred during the Inter-RAT handover performed in the mobile communication system according to the first embodiment of the present invention.

DETAILED DESCRIPTION (Mobile Communication System According to First Embodiment of the Present Invention)

With reference to FIG. 1 to FIG. 4, the mobile communication system according to the first embodiment of the present invention will be explained.

Figure 1:
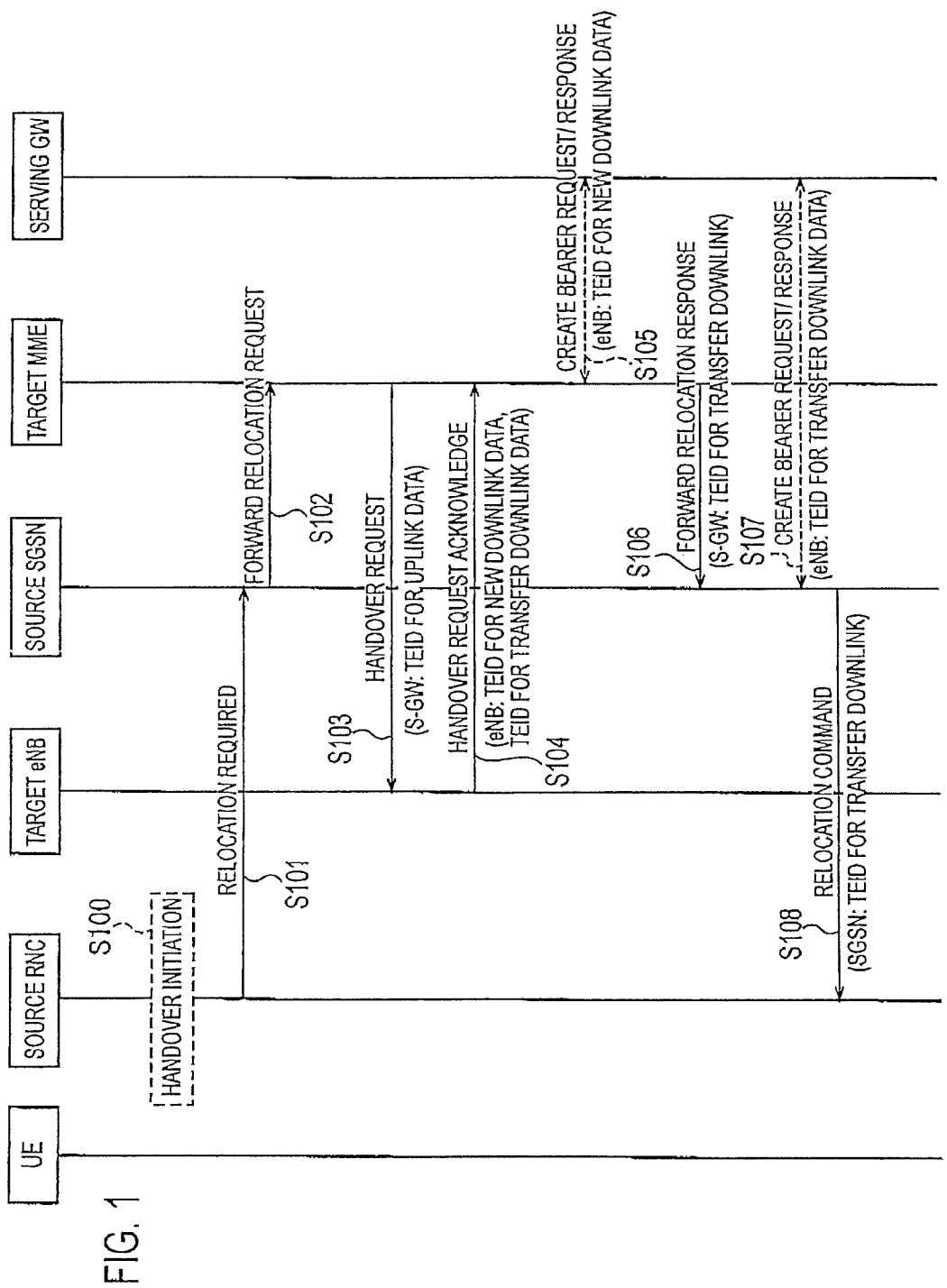
FIG. 1 is a diagram explaining an Inter-RAT handover performed in a mobile communication system according to a first embodiment of the present invention.
Figure 2:
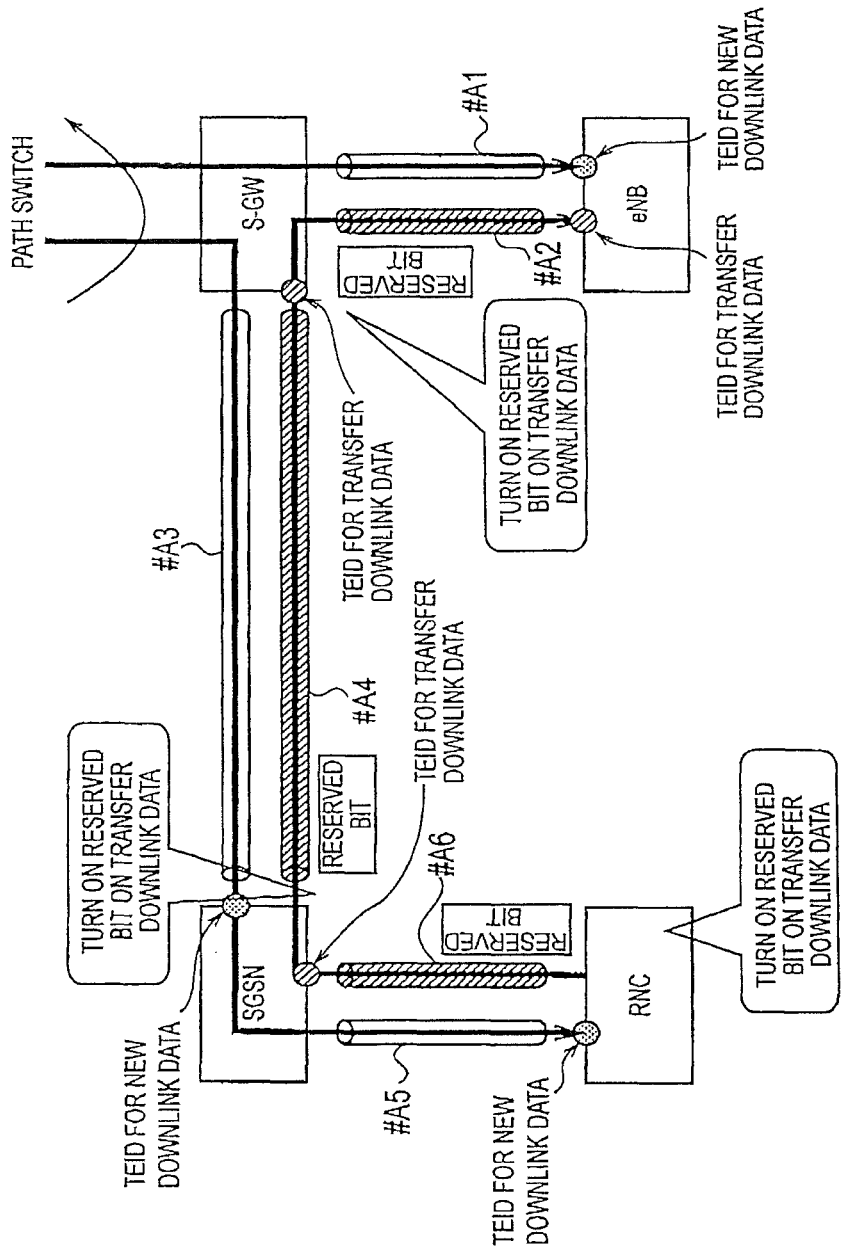
FIG. 2 is a diagram explaining a reordering control of U plane data during the Inter-RAT handover performed in the mobile communication system according to the first embodiment of the present invention.

As illustrated in FIG. 1 and FIG. 2, in the mobile communication system according to the embodiment, a radio access network of the E-UTRAN scheme and a radio access network of the UTRAN scheme are mixed.

In the present embodiment, an example in which a mobile station UE performs an Inter-RAT handover from a cell of the radio access network of the UTRAN scheme (first radio access network) to a cell of the radio access network of the E-UTRAN scheme (second radio access network) will be explained.

As illustrated in FIG. 1, in a step S100, when the radio network controller RNC (first radio access apparatus, Source-RNC) within the radio access network of the UTRAN scheme determines to start an Inter-RAT handover of the mobile station UE from the cell of the radio access network of the UTRAN scheme to the cell of the radio access network of the E-UTRAN scheme, then, in a step S101, the radio network controller RNC transmits a "Relocation Required" message requesting a switching center SGSN (Source-SGSN) connected to the radio access network of the UTRAN scheme to perform the above-described Inter-RAT handover.

In step S102, the switching center SGSN transmits a "Forward Relocation Required" message to a mobility management apparatus MME (Target-MME) that connects the radio access network of the UTRAN scheme and the radio access network of the E-UTRAN scheme.

In step S103, the mobility management apparatus MME transmits a "Handover Request" message to the radio base station eNB (second radio access apparatus, Target-eNB) within the radio access network of the E-UTRAN scheme.

In this case, the "Handover Request" message includes "TEID (Tunnel Endpoint Identifier)" for identifying an endpoint at the side of a serving gateway apparatus S-GW of a tunnel for uplink data set between the serving gateway apparatus S-GW and the radio base station eNB.

In step S104, the radio base station eNB transmits a "Handover Request ACK" message to the mobility management apparatus MME.

In this case, the "Handover Request ACK" message includes: "TEID" for identifying an endpoint at the side of the radio base station eNB of a tunnel for new downlink data #A1 set between the serving gateway apparatus S-GW and the radio base station eNB; and "TEID" for identifying an endpoint at the side of the radio base station eNB of a tunnel for transfer downlink data #A2 set between the serving gateway apparatus S-GW and the radio base station eNB.

It is noted that the new downlink data is downlink data transmitted from the serving gateway apparatus S-GW to the radio network controller RNC via the switching center SGSN.

Further, the transfer downlink data is downlink data transferred from the radio base station eNB to the radio network controller RNC via the serving gateway apparatus S-GW and the switching center SGSN.

In step S106, the mobility management apparatus MME transmits a "Forward Relocation Response" message to the switching center SGSN.

In this case, the "Forward Relocation Response" message includes "TEID" for identifying an endpoint at the side of a serving gateway apparatus S-GW of a tunnel for transfer downlink data #A4 set between the serving gateway apparatus S-GW and the switching center SGSN.

In step S108, the switching center SGSN transmits the "Relocation Command" message to the radio network controller RNC.

In this case, the "Relocation Command" message includes "TEID" for identifying an endpoint at the side of a switching center SGSN of a tunnel for transfer downlink data #A6 set between the switching center SGSN and the radio network controller RNC.

In this case, a timing at which "TEID" for identifying an endpoint of the tunnel for new downlink data #A1 and the tunnel for transfer downlink data #A2 at the side of the radio base station eNB is notified to the serving gateway apparatus S-GW may coincide either with step S105 or step S107.

It is noted that the tunnel for new downlink data #A3 is a tunnel for new downlink data before the Inter-RAT handover set between the serving gateway apparatus S-GW and the switching center SGSN, and the tunnel for new downlink data #A5 is a tunnel for new downlink data before the Inter-RAT handover set between the switching center SGSN and the radio network controller RNC.

Then, when the serving gateway apparatus S-GW performs a path switch, i.e., when a first state where the downlink data is transmitted to the radio network controller RNC is switched to a second state where the downlink data is transmitted to the radio base station eNB, the radio network controller RNC is configured to set specific information (e.g., a value starting with "1" in "Spare bit" or a value of which the upper 2 bits in "Next Extension Header Field Value" start with "11") to the downlink data received from the serving gateway apparatus S-GW, and to transfer it to the radio base station eNB, as illustrated in FIG. 2.

For example, as illustrated in FIG. 3, the radio network controller RNC may be configured to set "1" to a specific bit (Spare bit) in the GTP-U header of the downlink data, i.e., a fourth bit of a first octet, and then, to transfer the downlink data to the radio base station eNB.

Alternately, as illustrated in FIG. 4, "Type of Extension Header" for data transfer identification is newly defined in the GTP-U header, and "Next Extension Header Field Value" therefor, e.g., "10000000" or "11000011", is defined.

The radio network controller RNC may be configured to set the above-mentioned "Next Extension Header Field Value" for data transfer identification, to "Next Extension Header Type" in the GTP-U header of the downlink data (packets), and then, to transfer the downlink data to the radio base station eNB.

In this case, when the value of which the upper 2 bits start with "11" is set to the above-mentioned "Next Extension Header Field Value" for data transfer identification, e.g., when "11000011" is set, the switching center SGSN and the serving gateway apparatus S-GW may also be configured to analyze the "Next Extension Header Type" and then to transfer the downlink data.

On the other hand, when the value of which the upper 2 bits start with "10" is set to the above-mentioned "Next Extension Header Field Value" for data transfer identification, e.g., when "10000000" is set, the switching center SGSN and the serving gateway apparatus S-GW may also be configured to transfer the downlink data without analyzing "Next Extension Header Type".

In this case, the serving gateway apparatus S-GW may be configured to transmit an "End Marker message (specific message)" that is a GTP-U message via the tunnels for new downlink data #A3 and #A5 after performing a path switch and after transmitting the last downlink data to the radio network controller RNC via the tunnels for new downlink data #A3 and #A5.

The radio network controller RNC is configured to transfer the "End Marker message" via the transfer downlink data-use tunnels #A6, #A4, and #A2 to the radio base station eNB, when receiving the "End Marker message" transmitted by the serving gateway apparatus S-GW.

By receiving the "End Marker message" that is a GTP-U message, the radio base station eNB becomes able to recognize that the transfer of the downlink data transmitted via the tunnels for new downlink data #A3 and #A5 is completed.

Further the radio base station eNB is configured to transmit, to the mobile station UE, the transfer downlink data to which specific information transferred from the radio network controller RNC (transfer downlink data) is set before the new downlink data to which the specific information transmitted from the serving gateway apparatus S-GW is not set (new downlink data).

It is noted that within the above-described tunnels #A1 to #A6, the downlink data is configured to be transmitted in a packet format to which the GTP-U header is added.

According to the mobile communication system of the first embodiment of the present invention, when the Inter-RAT handover is performed, the radio base station eNB that is a radio access apparatus of a handover target can distinguish between the transfer downlink data and new downlink data based on whether or not the specific information is set, so that it is possible to perform a reordering control for both of the data items.

(Mobile Communication System According to Second Embodiment of the Present Invention)

Figure 5:
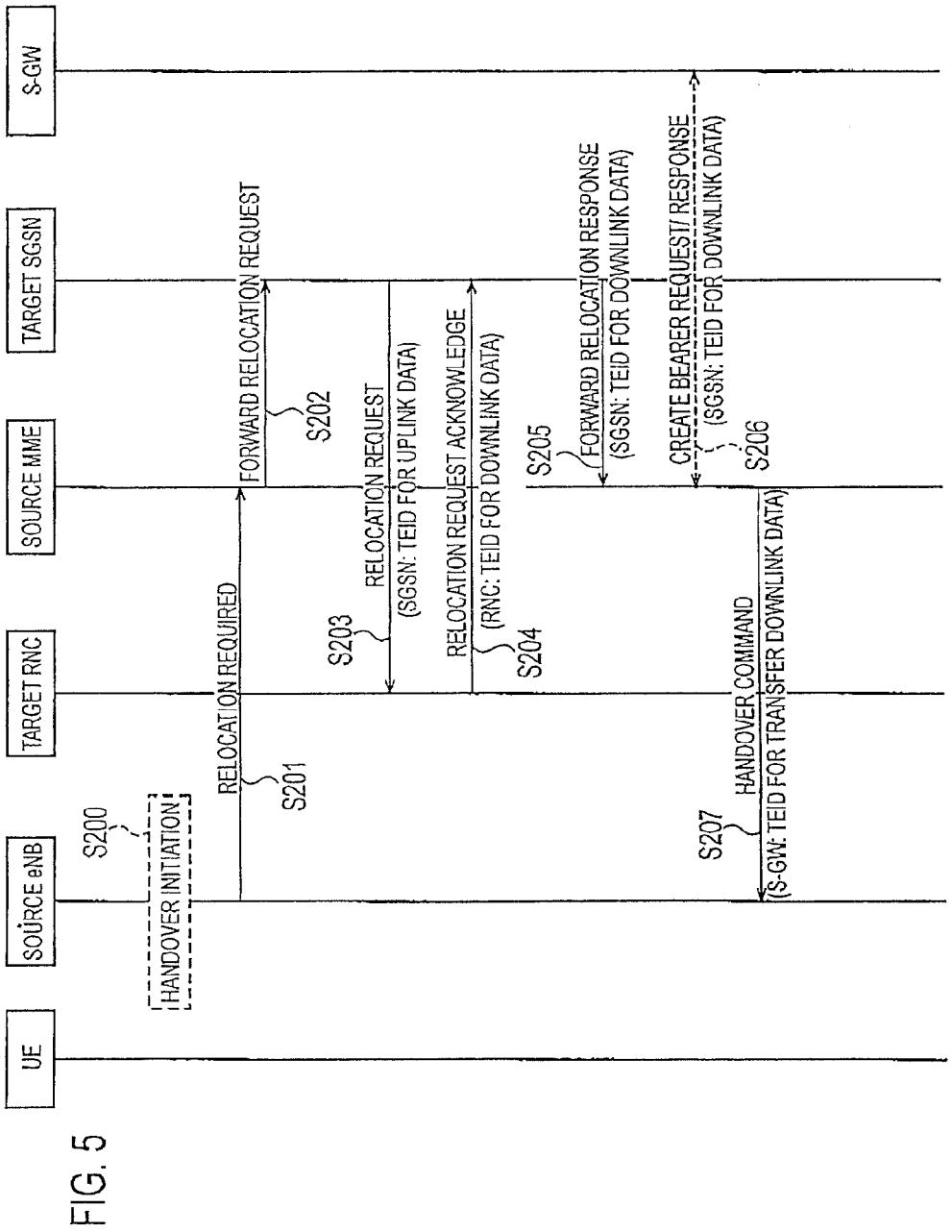
FIG. 5 is a diagram explaining the Inter-RAT handover performed in a mobile communication system according to a second embodiment of the present invention.
Figure 6:
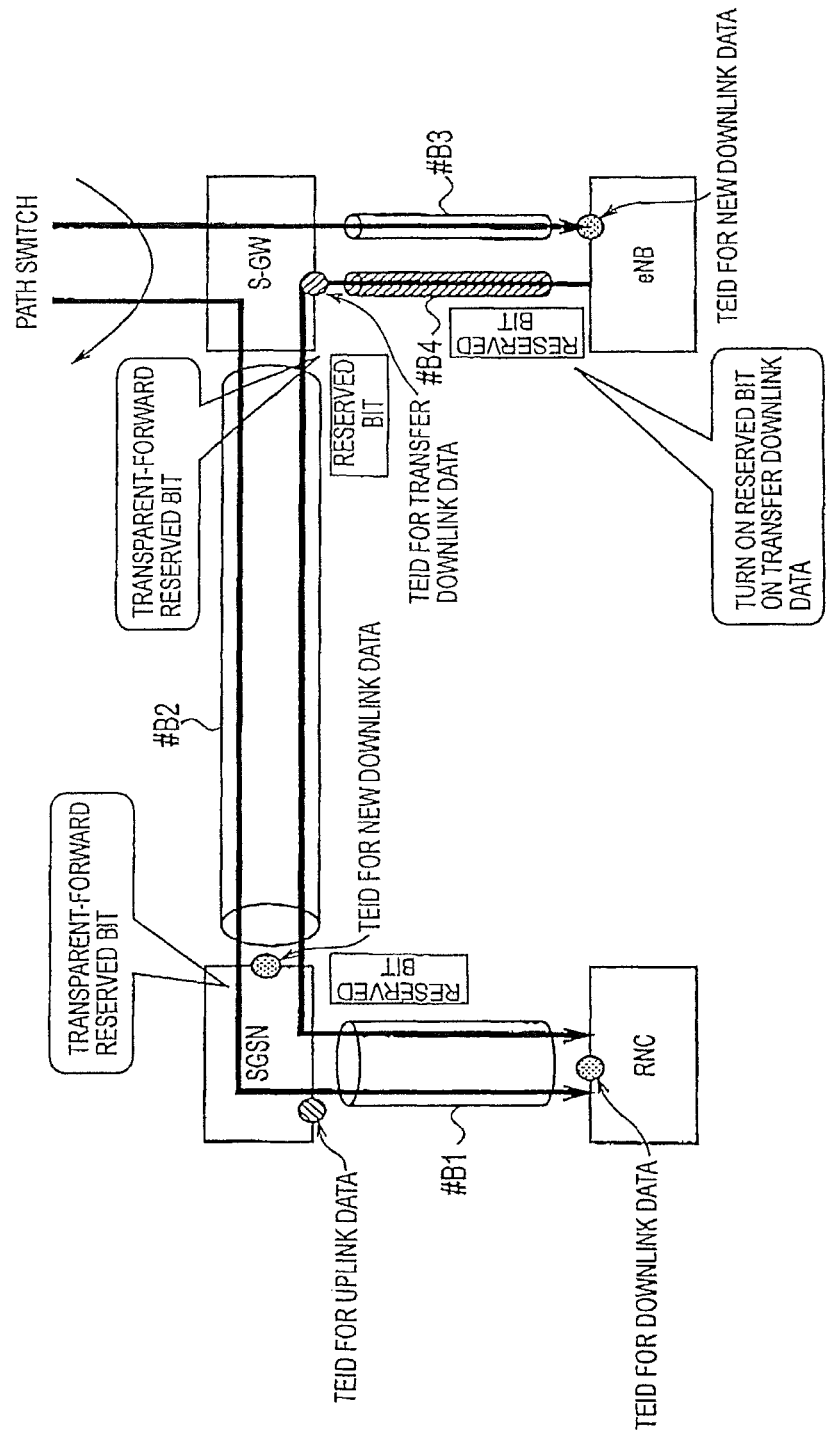
FIG. 6 is a diagram explaining a reordering control of U plane data during the Inter-RAT handover performed in the mobile communication system according to the second embodiment of the present invention.

With reference to FIG. 5 to FIG. 6, a mobile communication system according to a second embodiment of the present invention will be explained. The mobile communication system according to the second embodiment will be explained with an emphasis on a difference from the mobile communication system according to the above-described first embodiment, below.

In the present embodiment, an example in which the mobile station UE performs an Inter-RAT handover from a cell of the radio access network of the E-UTRAN scheme (first radio access network) to a cell of the radio access network of the UTRAN scheme (second radio access network) will be explained.

As illustrated in FIG. 5, in step S200, when the radio base station eNB (first radio access apparatus, Source-eNB) within the radio access network of the E-UTRAN scheme determines a start of the Inter-RAT handover from a cell of a radio access network of the E-UTRAN scheme of the mobile station UE to a cell of a radio access network of the E-UTRAN scheme, then in step S201, a "Relocation Required" message requesting to perform the above-described Inter-RAT handover is transmitted to the mobility management apparatus MME (Source-MME).

In step S202, the mobility management apparatus MME transmits a "Forward Relocation Required" message to the switching center SGSN (Target-SGSN).

In step S203, the switching center SGSN transmits a "Relocation Request" message to the radio network controller RNC (second radio access apparatus, Target-RNC) within the radio access network of the UTRAN scheme.

In this case, the "Relocation Request" message includes "TEID" for identifying an endpoint at the side of the switching center SGSN of the tunnel for uplink data set between the switching center SGSN and the radio network controller RNC.

In step S204, the radio network controller RNC transmits a "Relocation Request ACK" message to the switching center SGSN.

In this case, such a "Relocation Request ACK" message includes "TEID" for identifying an endpoint at the side of the radio network controller RNC of a tunnel for downlink data #B1 set between the switching center SGSN and the radio network controller RNC.

Between the switching center SGSN and the radio network controller RNC, one tunnel for downlink data #B1 is configured to be set, and both of the new downlink data and the transfer downlink data are configured to be transmitted via the tunnel for downlink data #B1.

In step S205, the switching center SGSN transmits a "Forward Relocation Response" message to the mobility management apparatus MME.

In this case, such a "Forward Relocation Response" message may include "TEID" for indentifying an endpoint at the side of the switching center SGSN of the tunnel for downlink data #B2 set between the serving gateway apparatus S-GW and the switching center SGSN.

In this case, a timing at which "TEID" for identifying an endpoint at the side of the switching center SGSN of the tunnel for downlink data #B2 is notified to the serving gateway apparatus S-GW may coincide with either in step S206 or after step S206.

Between the serving gateway apparatus S-GW and the switching center SGSN, one tunnel for downlink data #B2 is configured to be set, and both of the new downlink data and the transfer downlink data are configured to be transmitted via the tunnel for downlink data #B2.

In step S207, the mobility management apparatus MME transmits a "Handover Command" message to the radio base station eNB.

In this case, the "Handover Command" message includes "TEID" for identifying the endpoint at the side of the serving gateway apparatus S-GW of the tunnel for transfer downlink data #B4 set between the serving gateway apparatus S-GW and the radio base station eNB.

It is noted that the tunnel for new downlink data #B3 is a tunnel for new downlink data before the Inter-RAT handover set between the serving gateway apparatus S-GW and the radio base station eNB.

Then, when the serving gateway apparatus S-GW performs a path switch, i.e., when a first state where the downlink data is transmitted to the radio base station eNB is switched to a second state where the downlink data is transmitted to the radio network controller RNC, the radio base station eNB sets specific information to the downlink data received from the serving gateway apparatus S-GW, and transfers it to the radio network controller RNC, as illustrated in FIG. 6.

In this case, a method of setting the specific information to the downlink data by the radio base station eNB is similar to the method of setting the specific information to the downlink data by the radio network controller RNC according to the above-described first embodiment.

It is configured such that the downlink data is transmitted in a packet format to which the GTP-U header is added, within the above-described tunnels #B1 to #B4.

According to the mobile communication system of the second embodiment of the present invention, when the Inter-RAT handover is performed, the radio network controller RNC that is a radio access apparatus of a handover target can distinguish between the transfer downlink data and new downlink data based on whether or not the specific information is set, so that it is possible to perform a reordering control for both of the data items.

(Mobile Communication System According to Third Embodiment of the Present Invention)

Figure 7:
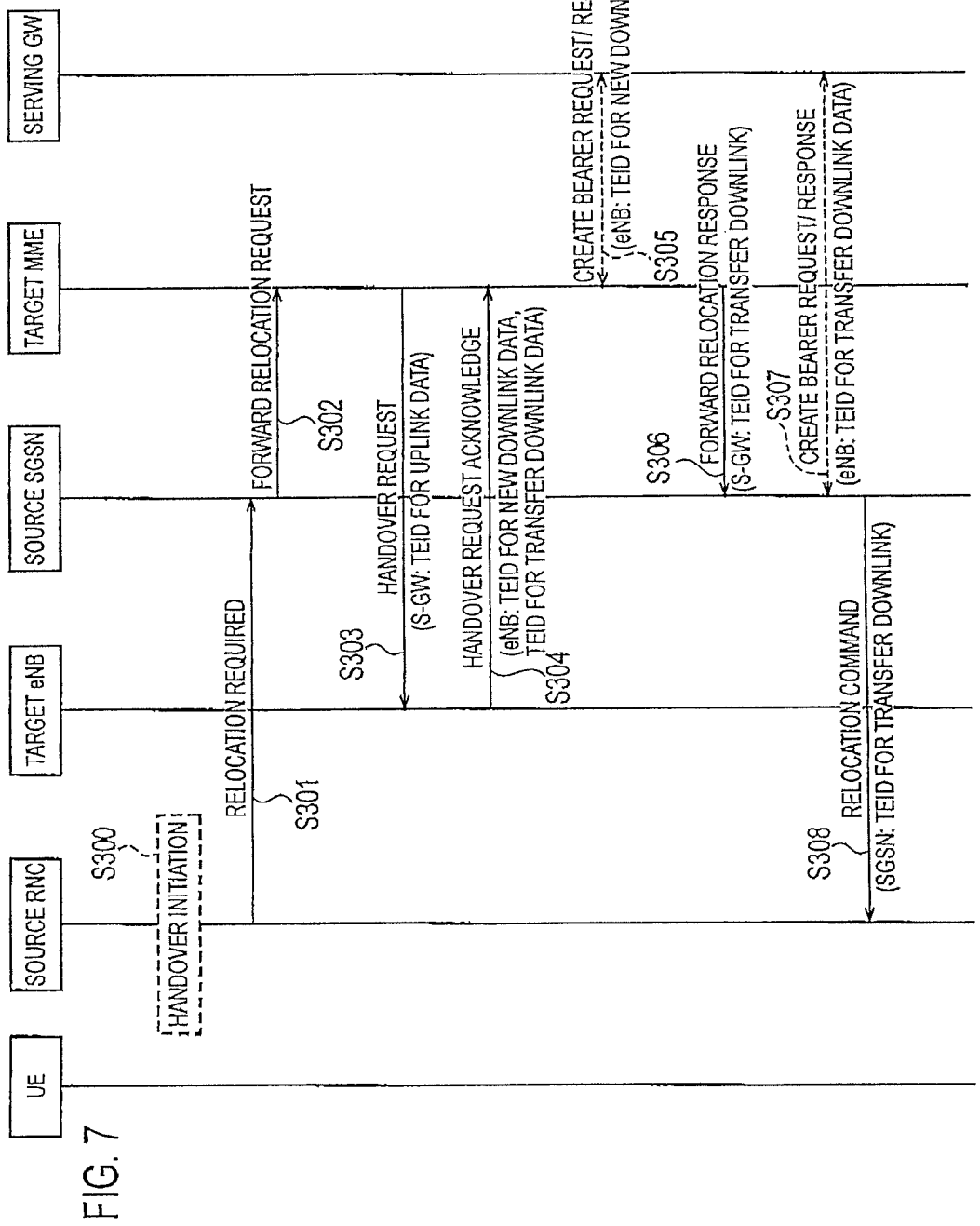
FIG. 7 is a diagram explaining the Inter-RAT handover performed in a mobile communication system according to a third embodiment of the present invention.
Figure 8:
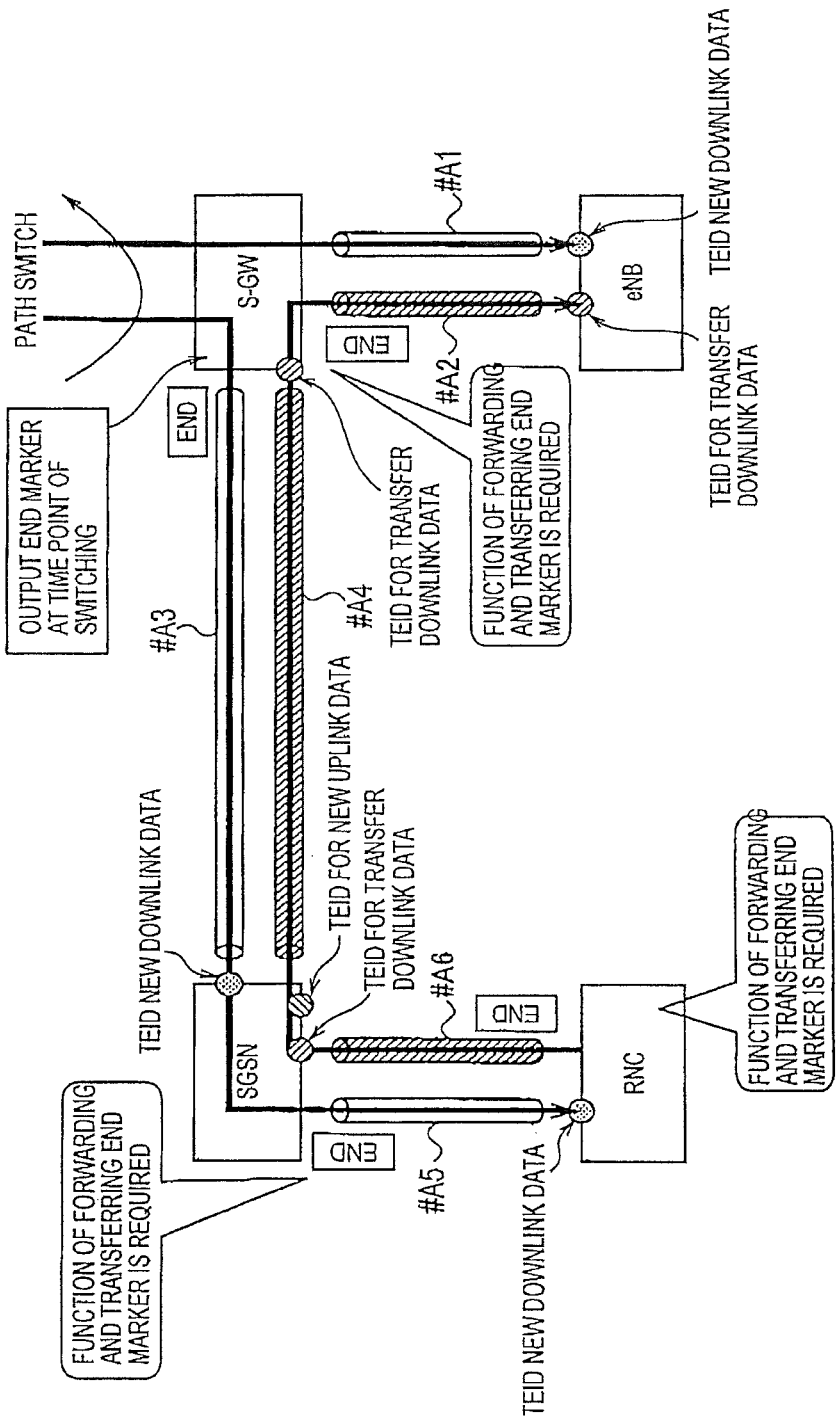
FIG. 8 is a diagram explaining a reordering control of U plane data during the Inter-RAT handover performed in the mobile communication system according to the third embodiment of the present invention.

With reference to FIG. 7 and FIG. 8, a mobile communication system according to a third embodiment of the present invention will be explained. The mobile communication system according to the third embodiment will be explained with an emphasis on a difference from the mobile communication system according to the above-described first embodiment, below.

In the present embodiment, an example in which a mobile station UE performs an Inter-RAT handover from a cell of the radio access network of the UTRAN scheme (first radio access network) to a cell of the radio access network of the E-UTRAN scheme (second radio access network) will be explained.

Operations from step S300 to step S308 in FIG. 7 are identical to those from step S100 to step S108 in FIG. 1.

In this case, as illustrated in FIG. 8, between the radio base station eNB (second radio access apparatus) and the serving gateway apparatus S-GW, the tunnel for new downlink data #A1 and the tunnel for transfer downlink data #A2 are set.

Further, between the serving gateway apparatus S-GW and the switching center SGSN connected to the radio access network of the UTRAN scheme (first radio access network), the tunnel for new downlink data #A3 and the tunnel for transfer downlink data #A4 are set.

Moreover, between the switching center SGSN and the radio network controller RNC (first radio access apparatus), the tunnel for new downlink data #A5 and the tunnel for transfer downlink data #A6 are set.

In this case, when the serving gateway apparatus S-GW performs a path switch, i.e., a first state where the downlink data is transmitted to the radio network controller RNC via the tunnels for new downlink data #A3 and #A5 is switched to a second state where the downlink data is transmitted via the tunnel for new downlink data #A1 to the radio base station eNB, he radio network controller RNC is configured to transfer the downlink data received from the serving gateway apparatus S-GW, to the radio base station eNB via the tunnels for transfer downlink data #A6, #A4, and #A2.

In this case, the serving gateway apparatus S-GW may be configured to transmit an "End Marker message (specific message)" that is a GTP-U message via the tunnels for new downlink data #A3 and #A5 after performing a path switch and after transmitting the last downlink data to the radio network controller RNC via the tunnels for new downlink data #A3 and #A5.

When receiving the "End Marker message" transmitted by the serving gateway apparatus S-GW, the radio network controller RNC is configured to transfer the "End Marker message" to the radio base station eNB via the tunnels for transfer downlink data #A6, #A4, and #A2.

Then, the radio base station eNB transmits, to the mobile station UE, the transfer downlink data transferred from the radio network controller RNC via the tunnels for transfer downlink data #A6, #A4, and #A2 before the new downlink data transmitted from the serving gateway apparatus S-GW via the tunnel for new downlink data #A1, until the "End Maker message" of the GTP-U is received.

In this case, the radio base station eNB is configured to determine the downlink data received via the tunnel for new downlink data #A1 from the serving gateway apparatus S-GW as the new downlink data, and to determine the downlink data received via the tunnel for transfer downlink data #A2 from the serving gateway apparatus S-GW as the transfer downlink data.

It is noted that within the above-described tunnels #A1 to #A6, the downlink data is configured to be transmitted in a packet format to which the GTP-U header is added.

According to the mobile communication system according to the third embodiment of the present invention, when the Inter-RAT handover is performed, the radio base station eNB that is the radio access apparatus of a handover target can distinguish between the transfer downlink data and the new downlink data based on the "TEID" of the tunnel through which the downlink data has been transmitted, and can comprehend the completion of the transfer of the transfer downlink data based on the "End Maker", and thus, it is possible to perform a reordering control on both of the data items.

(Mobile Communication System According to Fourth Embodiment of the Present Invention)

Figure 9:
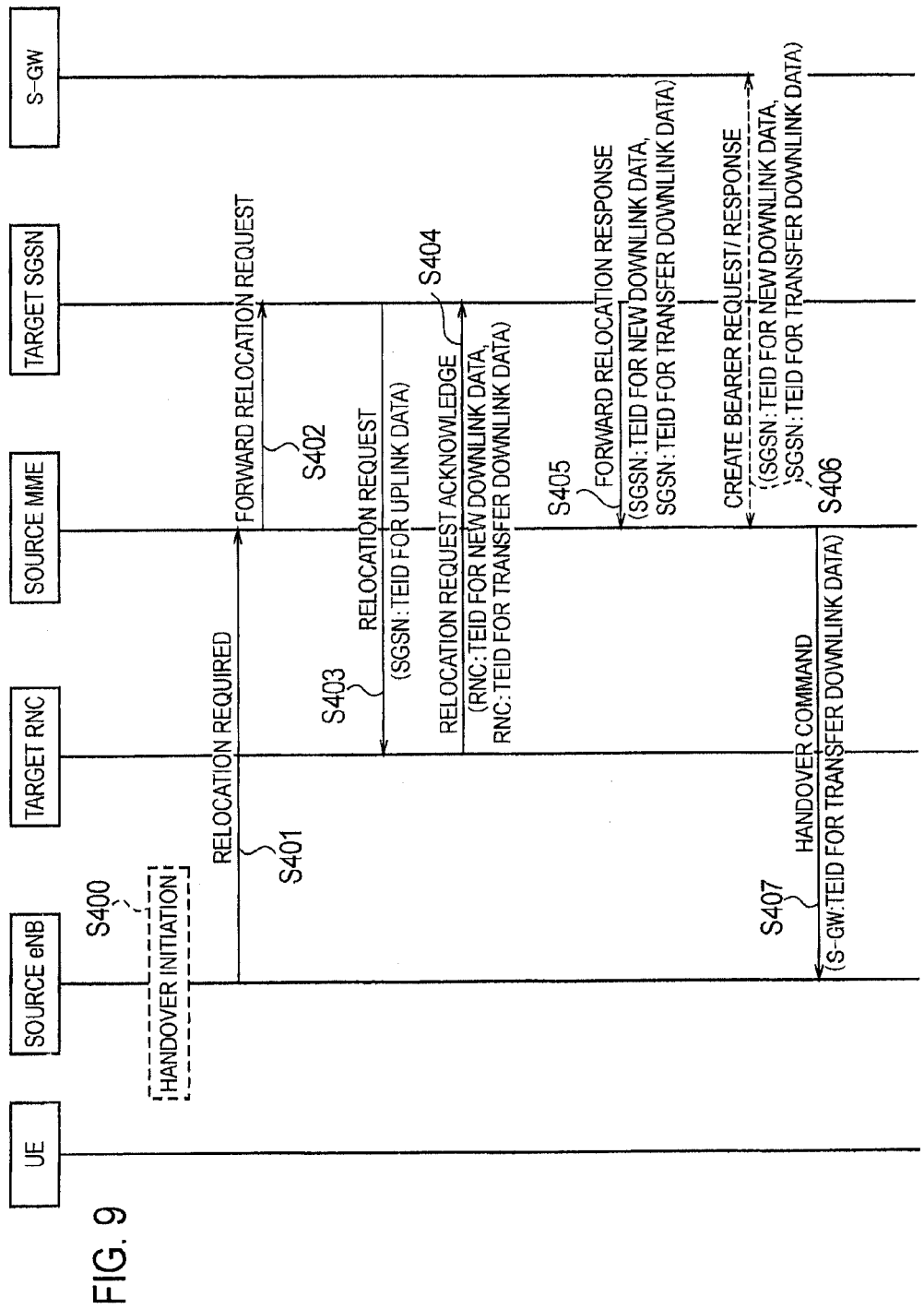
FIG. 9 is a diagram explaining the Inter-RAT handover performed in a mobile communication system according to a fourth embodiment of the present invention.
Figure 10:
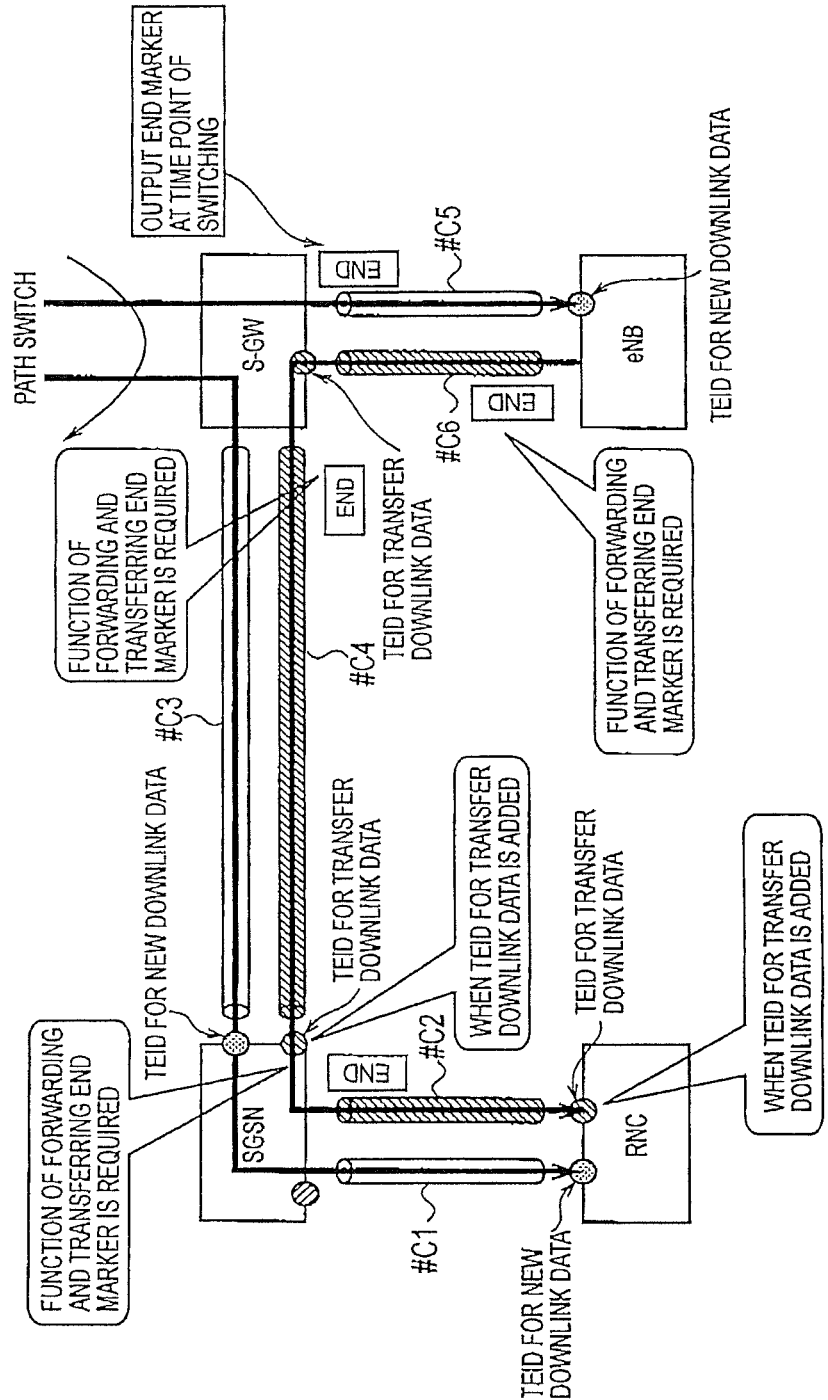
FIG. 10 is a diagram explaining a reordering control of U plane data during the Inter-RAT handover performed in the mobile communication system according to the fourth embodiment of the present invention.

With reference to FIG. 9 and FIG. 10, a mobile communication system according to a fourth embodiment of the present invention will be explained. The mobile communication system according to the fourth embodiment will be explained with an emphasis on a difference from the mobile communication system according to the above-described second embodiment, below.

In the present embodiment, an example in which the mobile station UE performs an Inter-RAT handover from a cell of the radio access network of the E-UTRAN scheme (first radio access network) to a cell of the radio access network of the UTRAN scheme (second radio access network) will be explained.

As illustrated in FIG. 9, operations from step S400 to step S403 are identical to those from step S200 to step S203 in FIG. 5.

In step S404, the radio network controller RNC (Target-RNC) transmits a "Relocation Request ACK" message to the switching center SGSN (Target-SGSN).

In this case, the "Relocation Request ACK" message includes: "TEID" for identifying an endpoint at the side of the radio network controller RNC of a tunnel for new downlink data #C1 set between the switching center SGSN and the radio network controller RNC; and "TEID" for identifying an endpoint at the side of the radio network controller RNC of a tunnel for transfer downlink data #C2 set between the switching center SGSN and the radio network controller RNC are included.

It is noted that between the switching center SGSN and the radio network controller RNC, the tunnel for new downlink data #C1 and the tunnel for transfer downlink data #C2 are configured to be set, the new downlink data is configured to be transmitted via the tunnel for new downlink data #C1 and the transfer downlink data is transmitted via the tunnel for transfer downlink data #C2.

In step S405, the switching center SGSN transmits the "Forward Relocation Response" message to the mobility management apparatus MME (Source-MME).

In this case, such a "Forward Relocation Response" message may include: "TEID" for indentifying an endpoint at the side of the switching center SGSN of the tunnel for new downlink data #C3 set between the serving gateway apparatus S-GW and the switching center SGSN; and "TEID" for indentifying an endpoint at the side of the switching center SGSN of the tunnel for transfer downlink data #C4 set between the serving gateway apparatus S-GW and the switching center SGSN.

In this case, a timing at which "TEIDs" for identifying the endpoints at the side of the switching center SGSN of the tunnel for new downlink data #C3 and the tunnel for transfer downlink data #C4 are notified to the serving gateway apparatus S-GW may coincide with either in step S406 or after step S406.

It is noted that between the serving gateway apparatus S-GW and the switching center SGSN, the tunnel for new downlink data #C3 and the tunnel for transfer downlink data #C4 are configured to be set, the new downlink data is configured to be transmitted via the tunnel for new downlink data #C3 and the transfer downlink data is configured to be transmitted via the tunnel for transfer downlink data #C4.

In step S407, the mobility management apparatus MME transmits a "Handover Command" message to the radio base station eNB.

In this case, the "Handover Command" message includes "TEID" for identifying an endpoint at the side of the serving gateway apparatus S-GW of a tunnel for transfer downlink data #C6 set between the serving gateway apparatus S-GW and the radio base station eNB.

It is noted that the tunnel for new downlink data #C5 is a tunnel for new downlink data before the Inter-RAT handover set between the serving gateway apparatus S-GW and the radio base station eNB.

Then, when the serving gateway apparatus S-GW performs a path switch, i.e., a first state where the downlink data is transmitted to the radio base station eNB via the tunnel for new downlink data #C5 is switched to a second state where the downlink data is transmitted to the radio network controller RNC via the tunnels for new downlink data #C3 and #C1, the radio base station eNB is configured to transfer the downlink data received from the serving gateway apparatus S-GW to the radio network controller RNC via the tunnels for transfer downlink data #C6, #C4, and #C2.

In such a case, the serving gateway apparatus S-GW may be configured to transmit the "End Marker message" that is a GTP-U message via the tunnel for new downlink data #C5 after performing a path switch and after transmitting the last downlink data to the radio base station eNB via the tunnel for new downlink data #C5.

The radio base station eNB is configured to transfer the "End Marker message" via the tunnels for transfer downlink data #C6, #C4, and #C2 to the radio network controller RNC, when receiving the "End Marker message" transmitted by the serving gateway apparatus S-GW.

Then, the radio network controller RNC transmits, to the mobile station UE, the transfer downlink data transferred from the radio base station eNB via the tunnels for transfer downlink data #C6, #C4, and #C2 before the new downlink data transferred from the serving gateway apparatus S-GW via the tunnels for new downlink data #C3 and #C2, until the "End Marker message" that is a GTP-U message is received.

In this case, the radio network controller RNC is configured to determine the downlink data received via the tunnel for new downlink data #C1 from the switching center SGSN as the new downlink data, and to determine the downlink data received via the tunnel for transfer downlink data #C2 from the switching center SGSN as the transfer downlink data.

It is assumed that the downlink data is configured to be transmitted in a packet format to which the GTP-U header is added, within the above-described tunnels #C1 to #C6.

According to the mobile communication system according to the fourth embodiment of the present invention, when the Inter-RAT handover is performed, the radio network controller RNC that is the radio access apparatus of a handover target can distinguish between the transfer downlink data and the new downlink data based on the TEID of the tunnel through which the downlink data has been transmitted, and can comprehend the completion of the transfer of the transfer downlink data based on the "End Maker", and thus, it is possible to perform a reordering control on both of the data items.

(Mobile Communication System According to Fifth Embodiment of the Present Invention)

Figure 11:
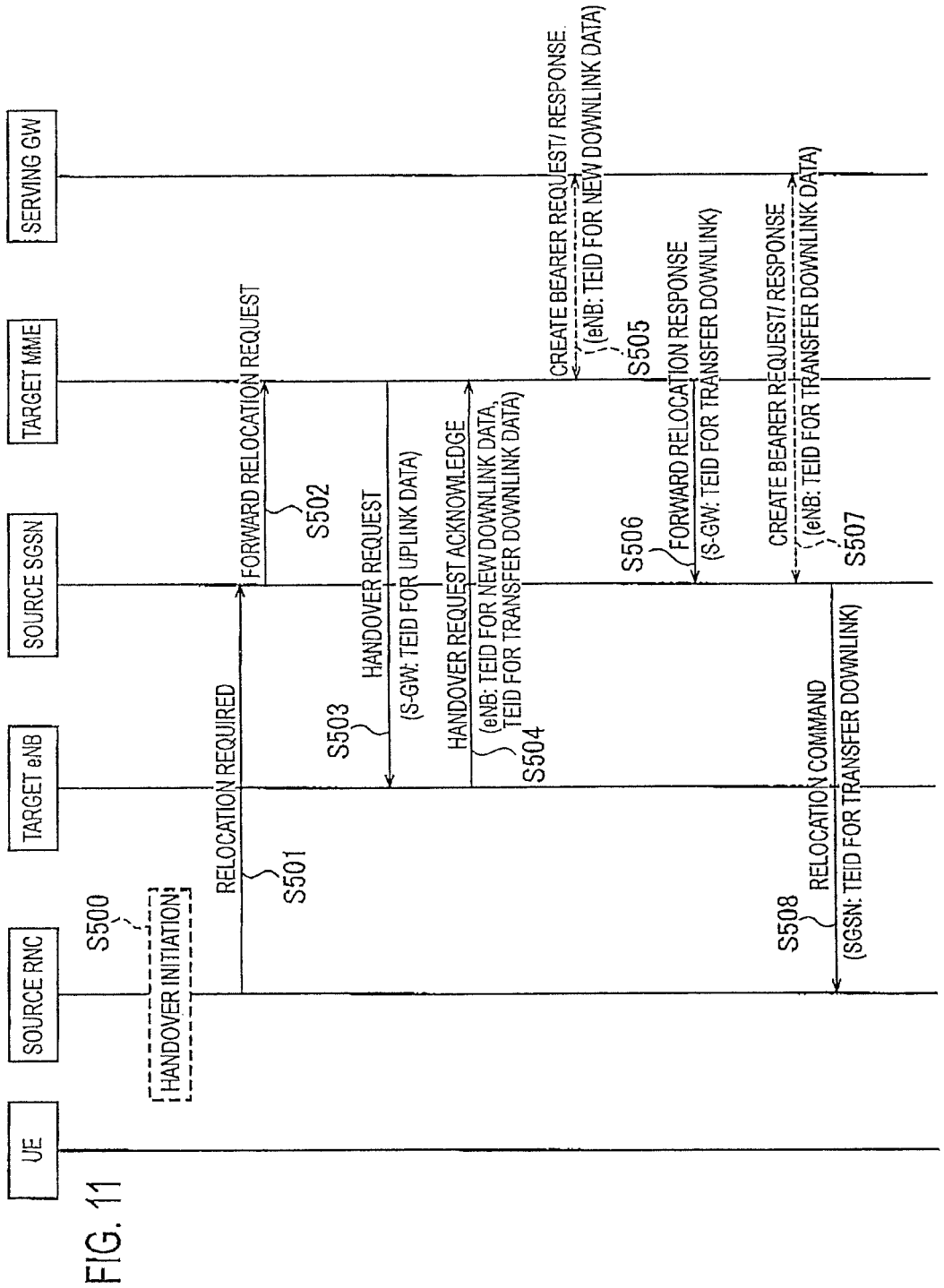
FIG. 11 is a diagram explaining the Inter-RAT handover performed in the mobile communication system according to a fifth embodiment of the present invention.
Figure 12:
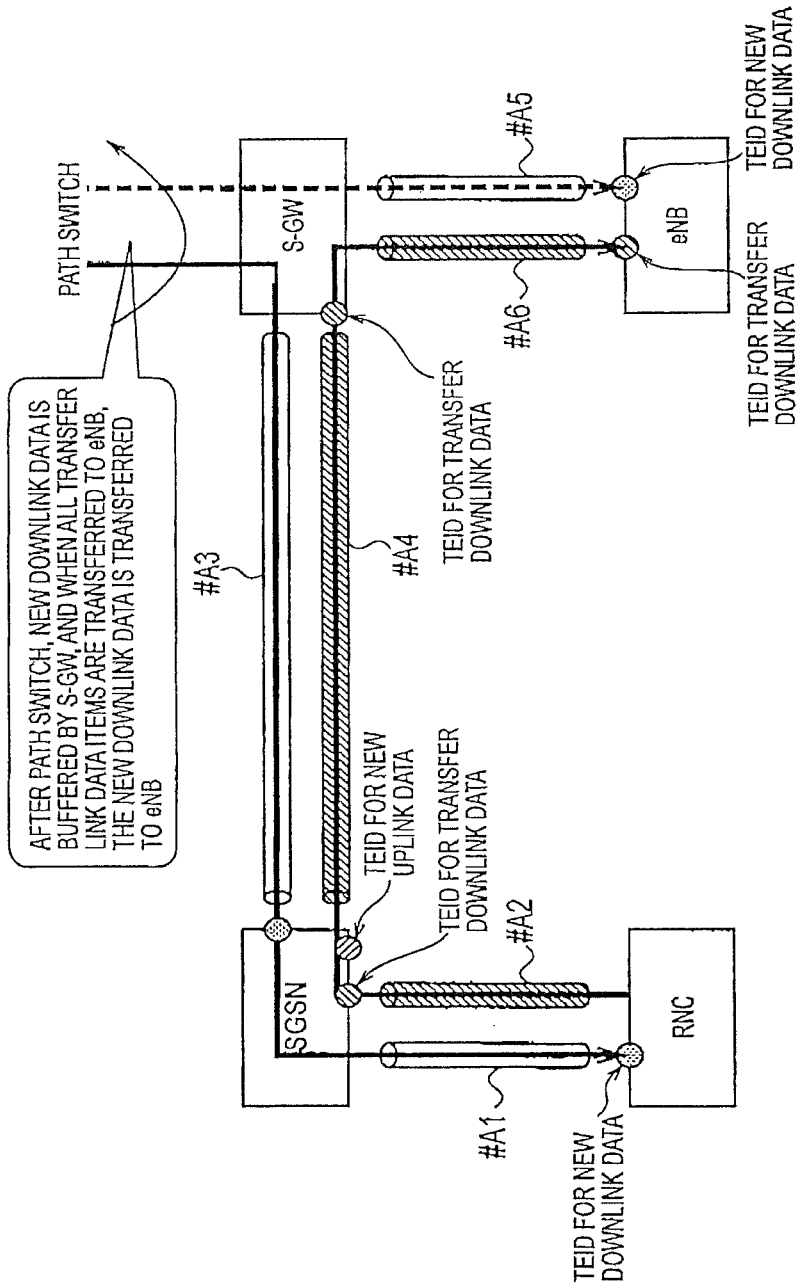
FIG. 12 is a diagram explaining a reordering control of U plane data during the Inter-RAT handover performed in the mobile communication system according to the fifth embodiment of the present invention.

With reference to FIG. 11 and FIG. 12, a mobile communication system according to a fifth embodiment of the present invention will be explained. The mobile communication system according to the fifth embodiment will be explained with an emphasis on a difference from the mobile communication system according to the above-described first embodiment, below.

In the present embodiment, an example in which a mobile station UE performs an Inter-RAT handover from a cell of the radio access network of the UTRAN scheme (first radio access network) to a cell of the radio access network of the E-UTRAN scheme (second radio access network) will be explained.

Operations from step S500 to step S508 in FIG. 11 are identical to those from step S100 to step S108 in FIG. 1.

Then, when the serving gateway apparatus S-GW performs a path switch, i.e., a first state where the downlink data is transmitted to the radio network controller RNC via the tunnels for new downlink data #A3 and #A1 is switched to a second state where the downlink data is transmitted via the tunnel for new downlink data #A5 to the radio base station eNB, the radio network controller RNC is configured to transfer the downlink data received from the serving gateway apparatus S-GW, to the radio base station eNB via the tunnels for transfer downlink data #A2, #A4, and #A6.

It is noted that the serving gateway apparatus S-GW is configured not to transmit the downlink data to the radio base station eNB via the tunnel for new downlink data #A5 before performing the path switch until the transfer to the radio base station eNB of the downlink data transmitted to the radio network control apparatus RNC, i.e., the downlink data transmitted via the tunnels for new downlink data #A3 and #A1, is all completed, even when the path switch is performed.

In this case, the serving gateway apparatus S-GW is configured to transmit the "End Marker message" that is a GTP-U message after performing the path switch and after transmitting the last downlink data to the radio network control apparatus RNC via the tunnels for new downlink data #A3 and #A1.

Then, the radio network control apparatus RNC transfers the "End Marker message" via the tunnels for transfer downlink data #A2, #A4, and #A6 when receiving the "End Marker message".

Therefore, when receiving the "End Marker message" from the tunnel #A4, the serving gateway apparatus S-GW can recognize that the transfer to the radio base station eNB of the downlink data transmitted via the tunnels for new downlink data #A3 and #A1 is completed.

That is, the serving gateway apparatus S-GW performs a path switch, and then, buffers the downlink data to be transmitted to the radio base station eNB via the tunnel for new downlink data #A5 after which the serving gateway apparatus S-GW transmits the downlink data to the radio base station eNB via the tunnel for new downlink data #A5 after receiving the "End Marker message" from the tunnel #A4.

It is noted that within the above-described tunnels #A1 to #A6, the downlink data is configured to be transmitted in a packet format to which the GTP-U header is added.

According to a mobile communication system based on the fifth embodiment of the present invention, it is configured such that when an Inter-RAT handover is performed, the serving gateway apparatus S-GW transmits the new downlink data to the radio base station eNB that is a radio access apparatus of a handover target after transmitting the transfer downlink data, and thus, it is possible to perform a reordering control of the transfer downlink data and the new downlink data without performing a special process in the radio base station eNB.

(Mobile Communication System According to Sixth Embodiment of the Present Invention)

Figure 13:
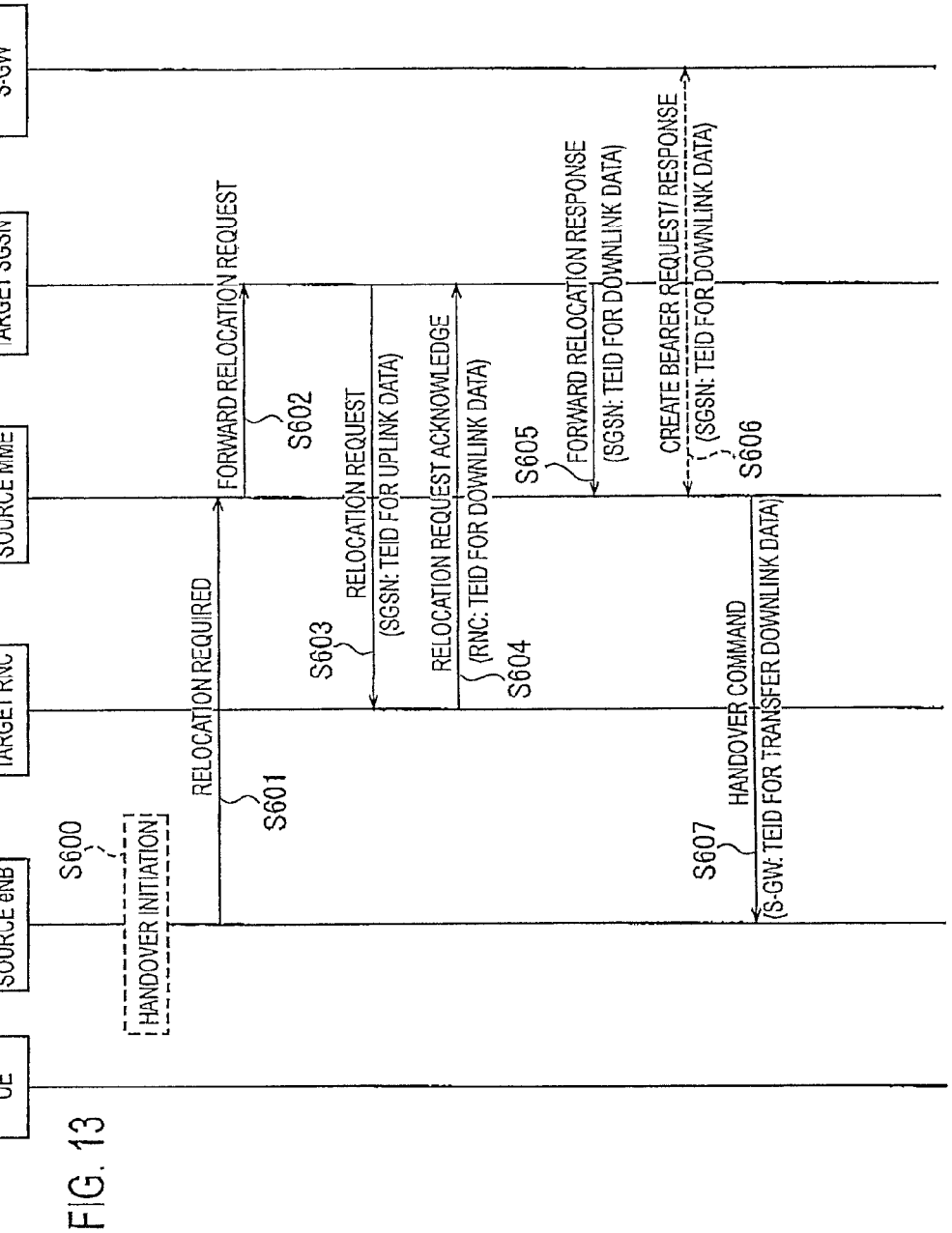
FIG. 13 is a diagram explaining the Inter-RAT handover performed in the mobile communication system according to a sixth embodiment of the present invention.
Figure 14:
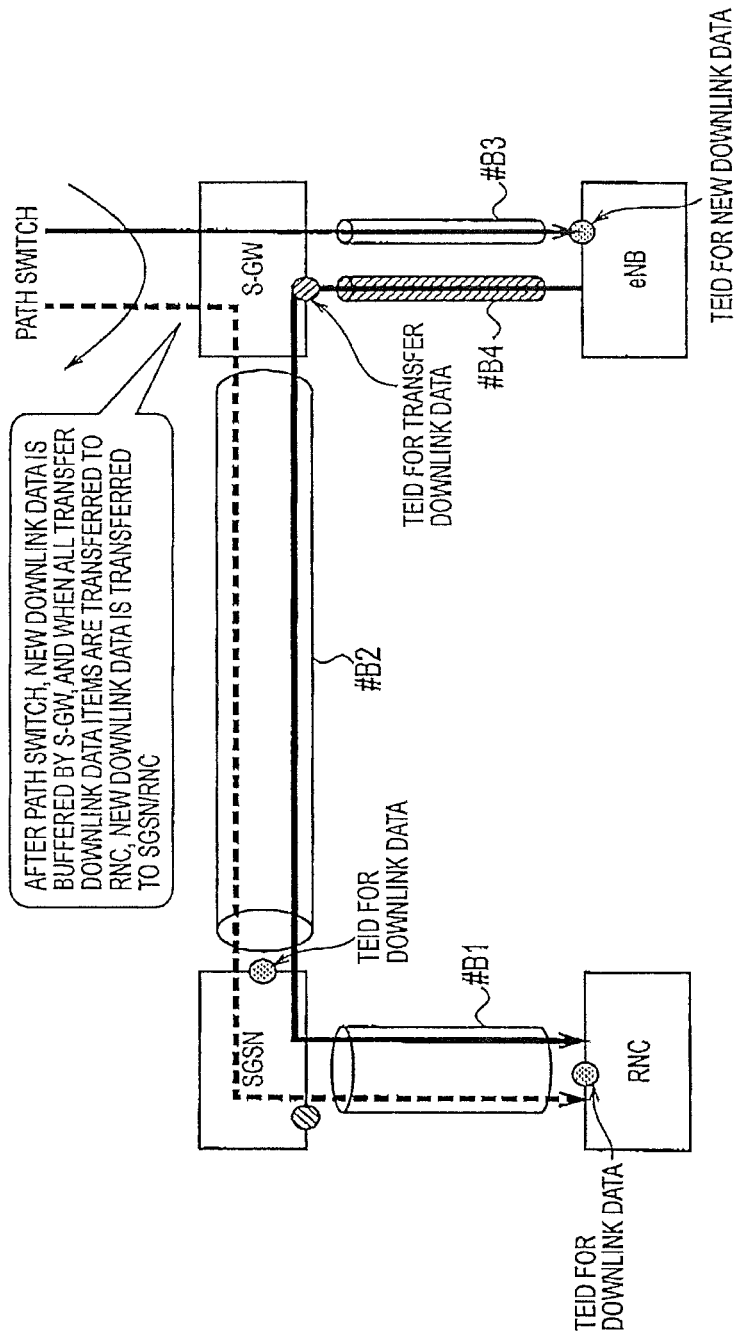
FIG. 14 is a diagram explaining a reordering control of U plane data during the Inter-RAT handover performed in the mobile communication system according to the sixth embodiment of the present invention.
Figure 15:
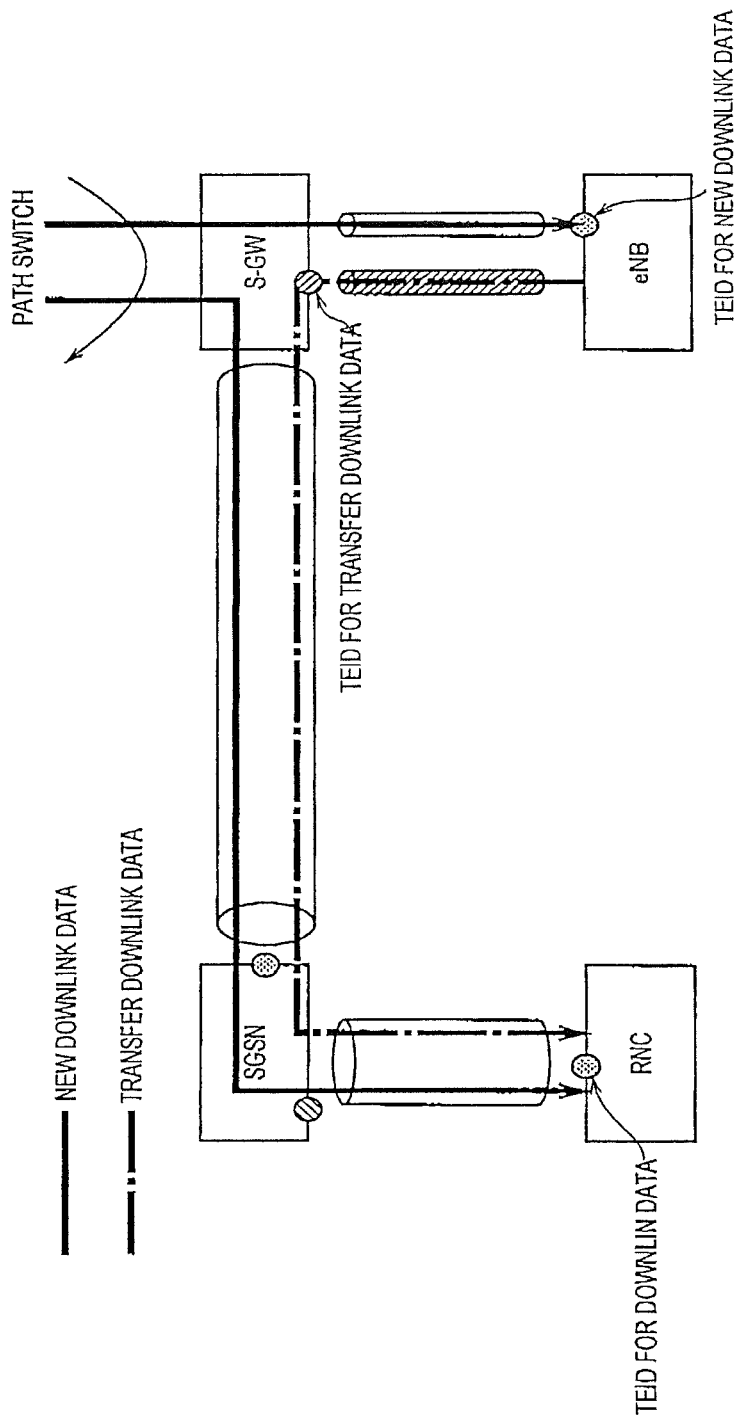
FIG. 15 is a diagram explaining a reordering control of U plane data during the Inter-RAT handover performed in a conventional mobile communication system.

With reference to FIG. 13 and FIG. 14, a mobile communication system according to a sixth embodiment of the present invention will be explained. The mobile communication system according to the sixth embodiment will be explained with an emphasis on a difference from the mobile communication system according to the above-described second embodiment.

In the present embodiment, an example in which the mobile station UE performs an Inter-RAT handover from a cell of the radio access network of the E-UTRAN scheme (first radio access network) to a cell of the radio access network of the UTRAN scheme (second radio access network) will be explained.

Operations from step S600 to step S607 in FIG. 13 are identical to those from step S200 to step S207 in FIG. 5.

Between the switching center SGSN and the radio network controller RNC, one tunnel for downlink data #B1 is configured to be set, and both of the new downlink data and the transfer downlink data are configured to be transmitted via the tunnel for downlink data #B1.

Between the serving gateway apparatus S-GW and the switching center SGSN, one tunnel for downlink data #B2 is configured to be set, and both of the new downlink data and the transfer downlink data are configured to be transmitted via the tunnel for downlink data #B2.

Moreover, between the serving gateway apparatus S-GW and the radio base station eNB, a tunnel for new downlink data #B3 and a tunnel for transfer downlink data #B4 are configured to be set, the new downlink data is configured to be transmitted via the tunnel for new downlink data #B3, and the transfer downlink data is configured to be transmitted via the tunnel for transfer downlink data #B4.

Then, when the serving gateway apparatus S-GW performs a path switch, i.e., when a first state where the downlink data is transmitted to the radio base station eNB via the tunnel for new downlink data #B3 is switched to a second state where the downlink data is transmitted to the radio network controller RNC via the tunnels for new downlink data #B2 and #B1, the radio base station eNB is configured to transfer the downlink data received from the serving gateway apparatus S-GW, to the radio network controller RNC via the tunnels for transfer downlink data-use #B4, #B2, and #B1.

It is noted that the serving gateway apparatus S-GW is configured not to transmit the downlink data to the radio network controller RNC before performing the path switch until the transfer to the radio network controller RNC of the downlink data transmitted to the radio base station eNB, i.e., the downlink data transmitted via the tunnel for new downlink data #B3, is all completed, even when the path switch is performed.

In this case, the serving gateway apparatus S-GW is configured to transmit the "End Marker message" that is a GTP-U message after performing the path switch and transmitting the last downlink data to the radio base station eNB via the tunnel for new downlink data #B3.

Then, the radio base station eNB transfers the "End Marker message" via the tunnels for transfer downlink data #B4, #B2, and #B1, when receiving the "End Marker message".

Therefore, when the serving gateway apparatus S-GW receives the "End Marker message" via the tunnel #B4, the serving gateway apparatus S-GW can recognize that the transfer of the downlink data transmitted via the tunnel for new downlink data #B3 to the radio network control apparatus RNC is all completed.

That is, the serving gateway apparatus S-GW performs a path switch, and then, buffers the downlink data to be transmitted to the radio network control apparatus RNC via the tunnels for downlink data #B2 and #B1 after which the serving gateway apparatus S-GW transmits the downlink data to the radio network control apparatus RNC via the tunnels for downlink data #B2 and #B1, when receiving the "End Marker message" from the tunnel #B4.

It is configured such that the downlink data is transmitted in a packet format to which the GTP-U header is added, within the above-described tunnels #B1 to #B4.

According to the mobile communication system of the sixth embodiment of the present invention, when the Inter-RAT handover is performed, the serving gateway apparatus S-GW is configured to transmit the new downlink data to the radio network controller RNC that is a radio access apparatus of a handover target after transmitting the transfer downlink data, and thus, it is possible to perform a reordering control of the transfer downlink data and the new downlink data without performing a special process in the radio network controller RNC.

The operation of the above-described radio base station eNB, the radio network controller RNC, the switching center SGSN and the serving gateway apparatus S-GW may be implemented by a hardware, may also be implemented by a software module executed by a processor, and may further be implemented by the combination of the both.

The software module may be arranged in a storing medium of an arbitrary format such as RAM (Random Access Memory), a flash memory, ROM (Read Only Memory), EPROM (Erasable Programmable ROM), EEPROM (Electronically Erasable and Programmable ROM), a register, a hard disk, a removable disk, and CD-ROM.

Such a storing medium is connected to the processor so that the processor can write and read information into and from the storing medium. Such a storing medium may also be accumulated in the processor. Such a storing medium and processor may be arranged in ASIC. Such ASIC may be arranged in the radio base station eNB, the radio network controller RNC, the switching center SGSN and the serving gateway apparatus S-GW. As a discrete component, such a storing medium and processor may be arranged in the radio base station eNB, the radio network controller RNC, the switching center SGSN and the serving gateway apparatus S-GW.

Thus, the present invention has been explained in detail by using the above-described embodiments; however, it is obvious that for persons skilled in the art, the present invention is not limited to the embodiments explained herein. The present invention can be implemented as a corrected, modified mode without departing from the gist and the scope of the present invention defined by the claims. Therefore, the description of the specification is intended for explaining the example only and does not impose any limited meaning to the present invention.

The invention claimed is:

1. A mobile communication method in which a mobile station receives downlink data from one of a first radio access apparatus within a first radio access network and a second radio access apparatus within a second radio access network, the method comprising the steps of:

when a gateway apparatus is switched from a first state where the downlink data is transmitted to the first radio access apparatus to a second state where the downlink data is transmitted to the second radio access apparatus, transferring, from the first radio access apparatus to the second radio access apparatus via GTP-U tunnel, the downlink data received from the gateway apparatus;

transmitting, from the gateway apparatus to the first radio access apparatus, a End Marker message which is GTP-U message indicating that the last downlink data is transmitted, after the gateway apparatus has transmitted the last downlink data;

transmitting, from the first radio access apparatus to the second radio access apparatus via GTP-U tunnel, the End Marker message, after the first radio access apparatus has transmitted the last downlink data;

transmitting, from the second radio access apparatus to the mobile station, transfer downlink data transferred from the first radio access apparatus, before new downlink data transmitted from the gateway apparatus; and transmitting, from the second radio access apparatus to the mobile station, the new downlink data, after the second radio access apparatus has received the End Marker message.

2. A radio access apparatus that can operate as a first radio access apparatus in a mobile communication system in which a mobile station receives downlink data from first radio access apparatus and a second radio access apparatus, the apparatus comprising:

when the gateway apparatus is switched from a first state where the downlink data is transmitted to the first radio access apparatus to a second state where the downlink data is transmitted to the second radio access apparatus, a reception unit receives a downlink data is transmitted from the gateway apparatus, a transfer unit configured to transfer, to the second radio access apparatus via GTP-U tunnel, the downlink data received by the reception unit; wherein and when the reception unit receives an End Marker message which is GTP-U message indicating that last downlink data is transmitted from the gateway apparatus, the transfer unit is configured to transfer the End Marker message to the second radio access apparatus after transferring the last downlink data via GTP-U tunnel.

* * * * *